(12) United States Patent
Morris

(10) Patent No.: US 7,874,787 B2
(45) Date of Patent: Jan. 25, 2011

(54) VERTICAL AXIS WIND TURBINE SYSTEM

(76) Inventor: Richard Morris, 2344 Apple St., Bethlehem, PA (US) 18015

( * ) Notice: Subject to any disclaimer, the term of this patent is extended or adjusted under 35 U.S.C. 154(b) by 0 days.

(21) Appl. No.: 12/610,661

(22) Filed: Nov. 2, 2009

(65) Prior Publication Data

US 2010/0196144 A1    Aug. 5, 2010

Related U.S. Application Data

(60) Provisional application No. 61/202,130, filed on Jan. 30, 2009.

(51) Int. Cl.
*F03D 3/04* (2006.01)
(52) U.S. Cl. .................. 415/4.2; 415/76; 415/907; 416/DIG. 9
(58) Field of Classification Search .......... 415/4.1, 415/4.2, 4.4, 54.1, 76, 184, 907, 909; 416/197 A, 416/DIG. 4, DIG. 9; 290/44, 55
See application file for complete search history.

(56) References Cited

U.S. PATENT DOCUMENTS

| | | | |
|---|---|---|---|
| 4,177,014 A * | 12/1979 | Kephart, Jr. | ............. 416/197 A |
| 4,191,505 A | 3/1980 | Kaufman | |
| 5,083,899 A | 1/1992 | Koch | |
| 5,332,354 A | 7/1994 | Lamont | |
| 5,447,412 A | 9/1995 | Lamont | |
| 5,463,257 A * | 10/1995 | Yea | .............. 290/55 |
| 6,448,669 B1 | 9/2002 | Elder | |
| 6,538,340 B2 | 3/2003 | Elder | |
| 6,674,181 B2 * | 1/2004 | Harbison | ............. 290/55 |
| 7,230,348 B2 | 6/2007 | Poole | |
| 7,344,353 B2 | 3/2008 | Naskali et al. | |

* cited by examiner

*Primary Examiner*—Nathaniel Wiehe
(74) *Attorney, Agent, or Firm*—Design IP

(57) ABSTRACT

A vertical axis wind turbine system includes a vertical shaft rotatably mounted about a vertical axis and an upper platen coupled to the vertical shaft. Vanes are coupled to the vertical shaft and extend downward from the upper platen. Each vane has a concave face and an opposing convex face. A lower platen is coupled to the vertical shaft and to each vane. The lower platen has an opening formed therein proximate to the concave face of each vane. A plenum is disposed below the vertical axis wind turbine and is rotatably mounted about the shaft for rotation about the vertical axis. The plenum includes a top portion disposed proximate to the lower platen and has an outlet port therein. The outlet port is in fluid communication with at least one of the lower platen openings. A plenum passage provides fluid communication between a plenum inlet and the outlet port.

17 Claims, 8 Drawing Sheets

VERTICAL AXIS WIND TURBINE SYSTEM

CROSS REFERENCE TO RELATED APPLICATION

This application claims priority from U.S. Provisional Patent Application Ser. No. 61/202,130, filed Jan. 30, 2009, which is incorporated by reference as if fully set forth.

FIELD OF INVENTION

The present invention relates to a vertical axis wind turbine system that incorporates a deflector that is used to divert air to a leeward side of the wind turbine.

BACKGROUND

Vertical axis wind turbines are used to generate rotational power from wind. These turbines are much more compact than traditional horizontal axis turbines and operate irrespective of the wind direction. One drawback of vertical axis wind turbines is that high pressure from the wind that impacts the turbine vanes on the windward side results in a low pressure on the leeward side. This low pressure restricts operation of the turbine and lowers the efficiency of the turbine.

It would be beneficial to develop a vertical axis wind turbine system that reduces inefficiencies in the turbine.

BRIEF SUMMARY OF THE INVENTION

Briefly, the present invention provides a vertical axis wind turbine system comprising a vertical axis wind turbine having a windward side and a leeward side. The vertical axis wind turbine comprises a vertical shaft rotatably mounted about a vertical axis and a plurality of vanes coupled to the vertical shaft. Each of the plurality of vanes has a concave face and an opposing convex face. A deflector is rotatably disposed about the vertical axis independently of the vertical axis wind turbine. The deflector is adapted to deflect wind from the windward side of the vertical axis wind turbine to a concave face on the leeward side of the vertical axis wind turbine.

The present invention further provides a vertical axis wind turbine system comprising a vertical axis wind turbine having a vertical shaft rotatably mounted about a vertical axis and an upper platen coupled to the vertical shaft. A plurality of vanes are coupled to the vertical shaft and extend downward from the upper platen. Each of the plurality of vanes has a concave face and an opposing convex face. A lower platen is coupled to the vertical shaft and to each of the plurality of vanes. The lower platen has an opening formed therein proximate to the concave face of each of the plurality of vanes. A plenum is disposed below the vertical axis wind turbine and rotatably mounted about the shaft for rotation about the vertical axis. The plenum comprises a top portion disposed proximate to the lower platen and having an outlet port therein. The outlet port is in fluid communication with at least one of the lower platen openings. The plenum also includes a plenum inlet and a plenum passage providing fluid communication between the plenum inlet and the outlet port.

The present invention also includes a vertical axis wind turbine system comprising a vertical axis wind turbine having a vertical shaft rotatably mounted about the vertical axis and a plurality of vanes coupled to the vertical shaft. Each of the plurality of vanes has a concave face and an opposing convex face. An upper platen is coupled to the vertical shaft and to each of the plurality of vanes. The upper platen has an opening therein disposed proximate to the convex face of each of the plurality of vanes. A lower platen is coupled to the vertical shaft and to each of the plurality of vanes. The lower platen has an opening formed therein proximate to the concave face of each of the plurality of vanes. A plenum is disposed below the vertical axis wind turbine and is rotatably mounted about the shaft for rotation about the vertical axis. The plenum comprises a top portion disposed proximate to the lower platen and has an outlet port therein. The outlet port is in fluid communication with at least one of the lower platen openings. The plenum further comprises a plenum inlet and a plenum passage providing fluid communication between the plenum inlet and the outlet port. A venturi is disposed above the vertical axis wind turbine and is rotatably mounted about the shaft for rotation about the vertical axis. The venturi comprises a bottom portion disposed proximate to the upper platen and having an inlet port therein. The inlet port being in fluid communication with at least one of the upper platen openings. The venturi further comprises a venturi outlet and a venturi passage providing fluid communication between the inlet port and the venturi outlet.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings certain embodiments of the present invention. It should be understood, however, that the invention is not limited to the precise arrangements and instrumentalities shown. In the drawings, the same reference numerals are employed for designating the same elements throughout the several figures. In the drawings.

DETAILED DESCRIPTION OF THE PREFERRED EMBODIMENTS

Figure 1:
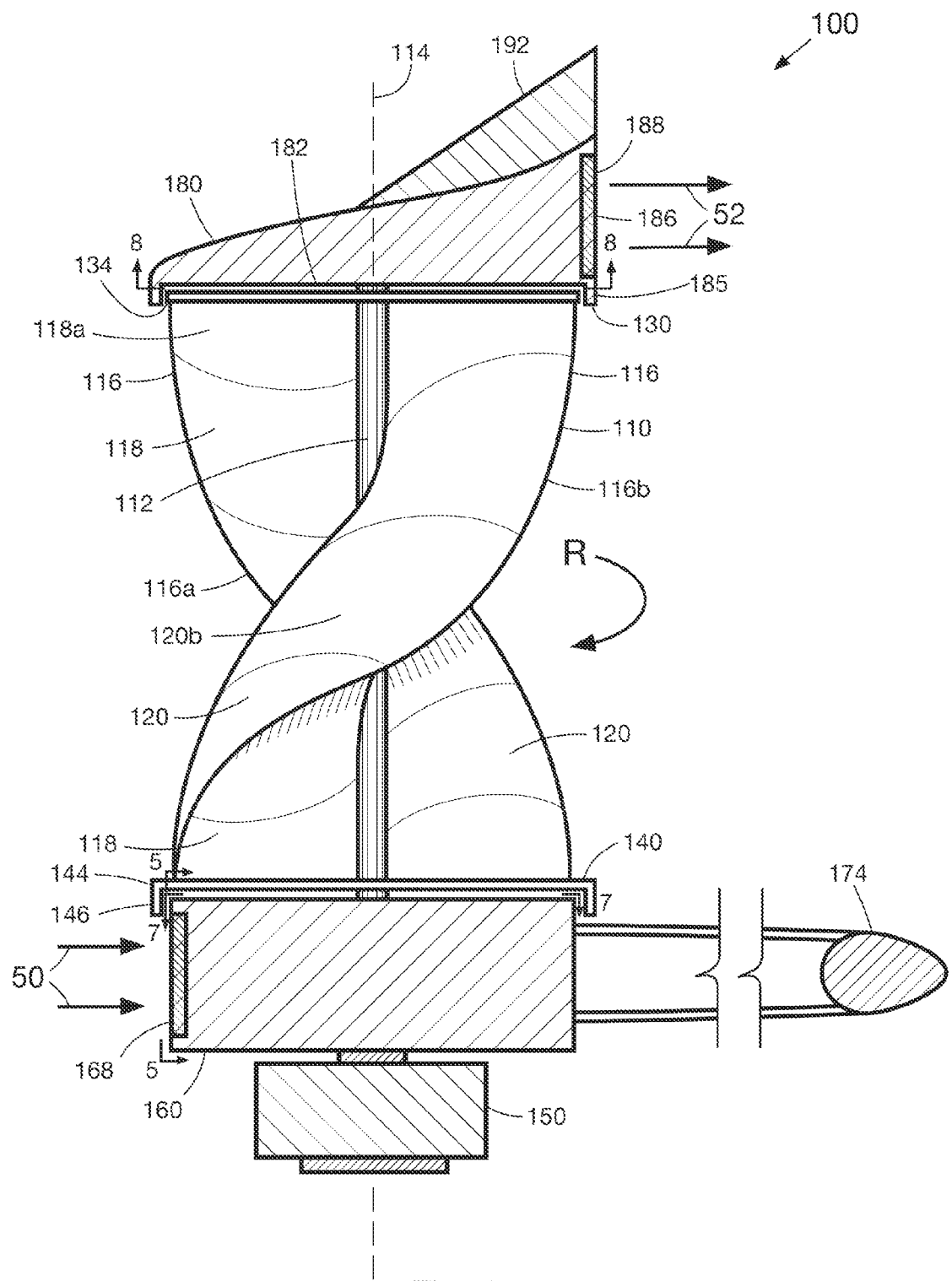
FIG. 1 is a side elevational view of a vertical axis wind turbine system according to an exemplary embodiment of the present invention.

In describing the embodiments of the invention illustrated in the drawings, specific terminology will be used for the sake of clarity. However, the invention is not intended to be limited to the specific terms so selected, it being understood that each specific term includes all technical equivalents operating in similar manner to accomplish similar purpose. It is understood that the drawings are not drawn exactly to scale. In the drawings, similar reference numbers are used for designating similar elements throughout the several figures.

The following describes particular embodiments of the present invention. It should be understood, however, that the invention is not limited to the embodiments detailed herein. As used herein, the term "windward" is defined as a side of the inventive system that faces into a blowing wind and "leeward" is defined as a side of the inventive system that faces away from the blowing wind.

Referring generally to the figures, the following disclosure refers a system 100 that is used to generate power from wind. Referring now to FIG. 1, system 100 diverts wind from a windward side 50 of a vertical axis wind turbine 110 ("turbine 110") to a leeward side 52 of turbine 110. The diverted wind pressurizes a low-pressure area on leeward side 52 and reduces drag induced on turbine 110 by the low pressure area, thereby increasing the efficiency of turbine 100.

Turbine 110 includes a vertical shaft 112 rotatably mounted about a vertical axis 114. A plurality of vanes 116 are fixedly coupled to vertical shaft 112 such that shaft 112 and vanes 116 turn as a unit as turbine 110 rotates. Each of the plurality of vanes 116 has a concave face 118 and an opposing convex face 120. In an exemplary embodiment, two (2) vanes 116a, 116b, each spaced 180 degrees apart from each other relative to vertical shaft 112, are used. Those skilled in the art, however, will recognize that more than two (2) vanes 116 may be used, so long as vanes 116 are evenly spaced about vertical shaft 112. Vanes 116 illustrated are configured for right-hand (clockwise looking down) rotation. Those skilled in the art, however, will recognize that vanes 116 may be configured for left-hand (counter-clockwise looking down) rotation.

Figure 2:
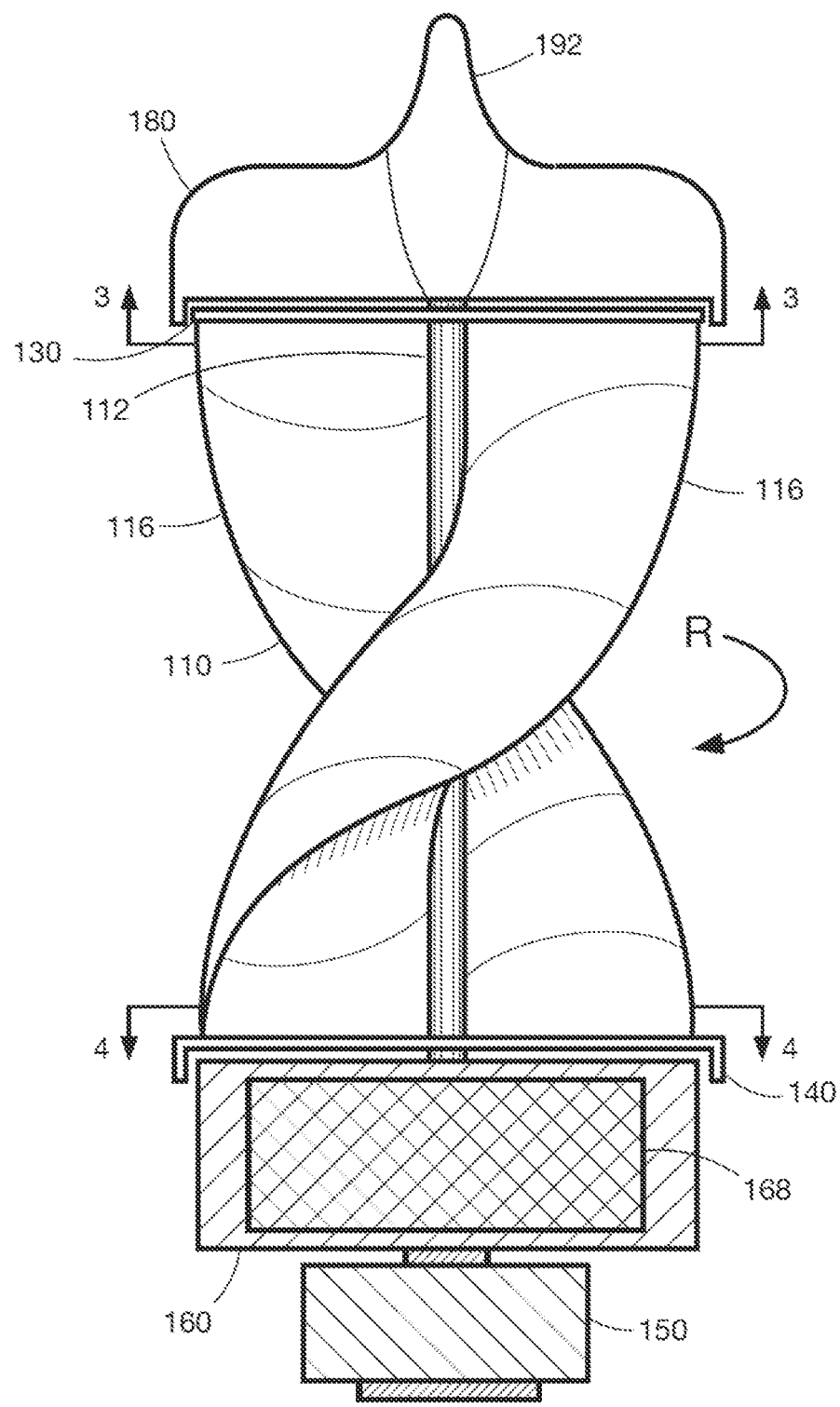
FIG. 2 is a front elevational view of the vertical axis wind turbine system of FIG. 1.
Figure 3:
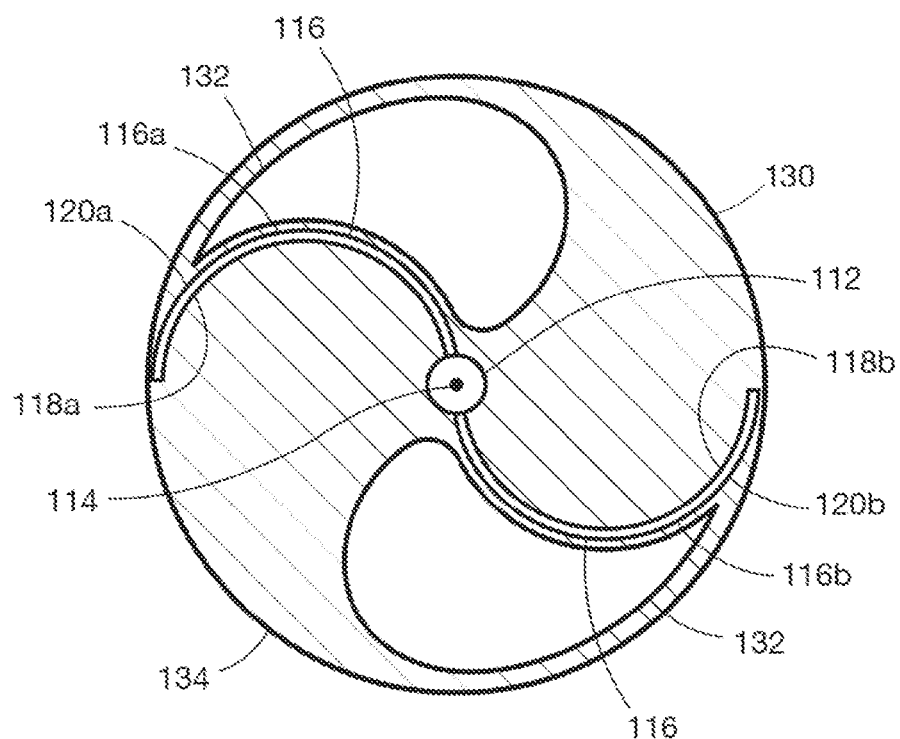
FIG. 3 is a sectional view of the vertical axis wind turbine system of FIG. 1, taken along lines 3-3 of FIG. 2.

With the exemplary embodiment of two (2) vanes 116, wind impinges on concave face 118a of vane 116a and on convex face 120b of vane 116b. Referring to FIGS. 1-3, each vane 116 is curved, such that each vane 116 forms a concave/convex half circle that curves 180 degrees about vertical shaft 112. Wind acting on a windward concave face 118a imparts more force than on windward convex face 120b, causing vertical shaft 112 to rotate.

Referring to FIGS. 2 and 3, vertical axis wind turbine 110 further includes an upper platen 130 coupled to vertical shaft 112 and to each of the plurality of vanes 116. Upper platen 130 extends in a plane generally perpendicular to vertical axis 114. Upper platen 130 has an opening 132 therein disposed proximate to convex faces 120a, 120b of each of the plurality of vanes 116a, 116b. As can be seen in FIG. 3, openings 132 may be generally curved teardrop shaped, with a portion of opening 132 generally following the curve of convex face 120 and a portion of opening 132 generally following an outer perimeter 134 of upper platen 130. In an exemplary embodiment, the total surface area of all of openings 132 is about one half the surface area of upper platen 130. Therefore, in the exemplary embodiment illustrated in FIG. 2, each opening 132 is about one quarter the surface area of upper platen 130.

Figure 4:
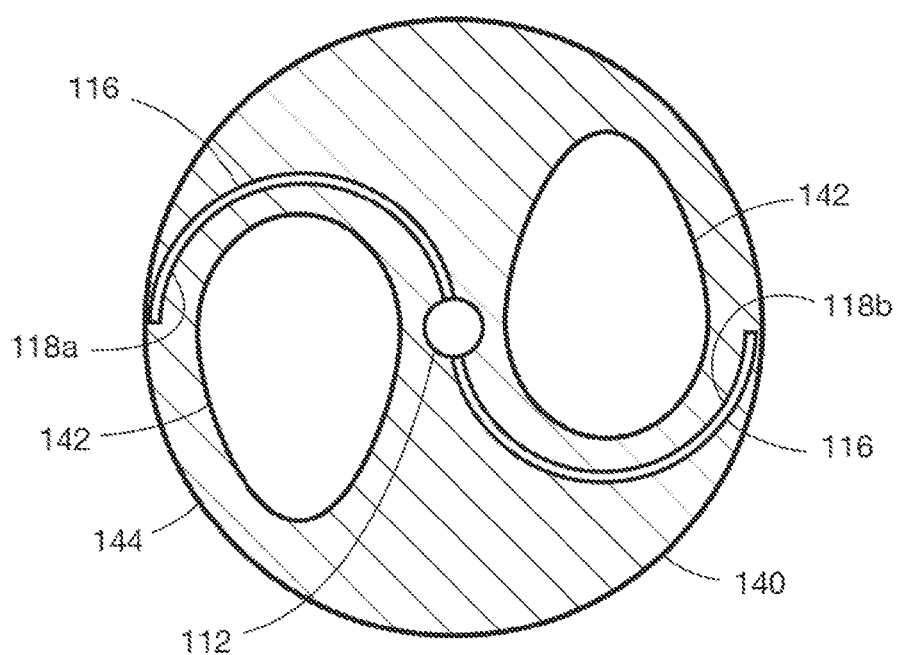
FIG. 4 is a sectional view of the vertical axis wind turbine system of FIG. 1, taken along lines 4-4 of FIG. 2.

Referring now to FIGS. 2 and 4, a lower platen 140 is coupled to vertical shaft 112 and to each of the plurality of vanes 116. Lower platen 140 extends in a plane generally parallel to the plane of upper platen 130. Lower platen 140 has an opening 142 formed therein proximate to concave faces 118a, 118b of each of the plurality of vanes 116a, 116b. As can be seen in FIG. 4, openings 142 may be generally egg shaped, with a portion of opening 142 generally following the curve of concave face 118 and a portion of opening 142 generally following an outer perimeter 144 of lower platen 140. In an exemplary embodiment, the total surface area of all of openings 142 is about one half the surface area of lower platen 140. Therefore, in the exemplary embodiment illustrated in FIG. 4, each opening 142 is about one quarter the surface area of lower platen 140.

Referring to FIGS. 1 and 2, vanes 116 extend between upper platen 130 and lower platen 140 from vertical shaft 112 to outer perimeters 134, 144 of upper platen 130 and lower platen 140, respectively. In an exemplary embodiment, the height of vertical axis wind turbine 110 is about twice the diameter of upper platen 130.

Figure 5:
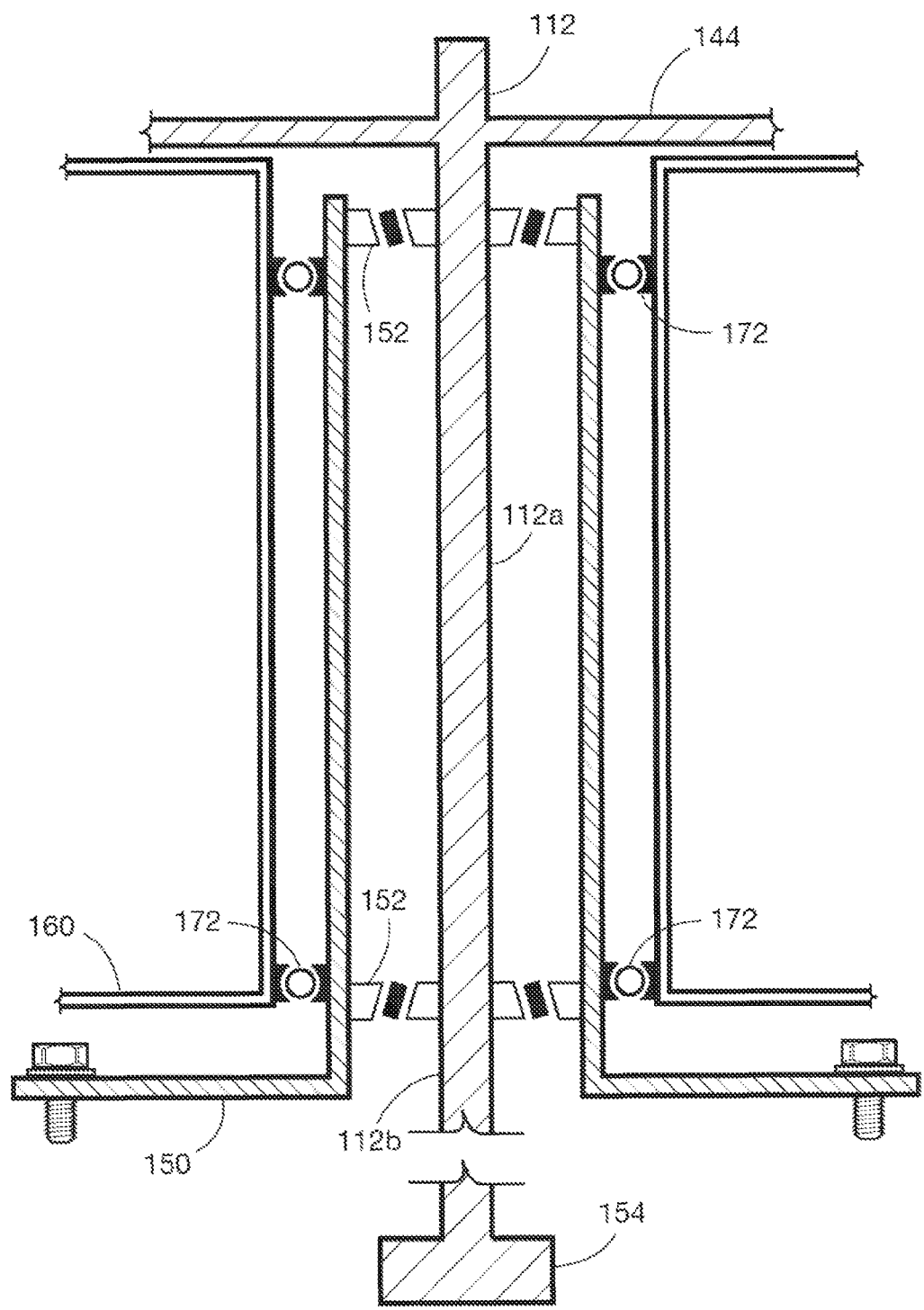
FIG. 5 is a an enlarged sectional view of a sectional view of the vertical axis wind turbine system of FIG. 1, taken along lines 5-5 of FIG. 1.

Referring to FIG. 5, shaft 112 extends downward away from lower platen 140. A middle portion 112a of shaft 112 is rotatably coupled to a stationary mount 150 that supports system 100. Bearings, such as, for example, tapered roller bearings 152, support shaft 112 for rotation within stationary mount 150. Those skilled in the art will recognize that other types of bearings besides tapered roller bearings may be used. As shown in the exemplary embodiment of FIG. 5, two sets of bearings 152 may be used, although more or less than two sets of bearings 152 may be used.

A lower, output, end 112b of shaft 112 is coupled to a generator 154. The coupling of shaft 112 to generator 154 may be accomplished through a speed reducer such as, for example, belts or gears. Alternatively, an input of generator 154 may be directly coupled to output end 112b of shaft 112. An exemplary generator 154 that may be directly coupled to output end 112b of shaft 112 is the STK permanent magnet frame-less direct drive alternator manufactured by Alxion of Paris, France.

Referring back to FIG. 1, a deflector, such as a plenum 160, is disposed below vertical axis wind turbine 110 and is rotatably mounted about shaft 112 for rotation about vertical axis 114. In an exemplary embodiment, plenum 160 is closely spaced from lower platen 140, such as, for example, about ¼ inch (about 0.62 cm). Lower platen 140 may include a lip 146 that extends downward from outer perimeter 144 of lower platen 140. Lip 146 shields the gap between plenum 160 and lower platen 140 and reduces foreign matter, including rain, from entering into the gap.

Figure 6:
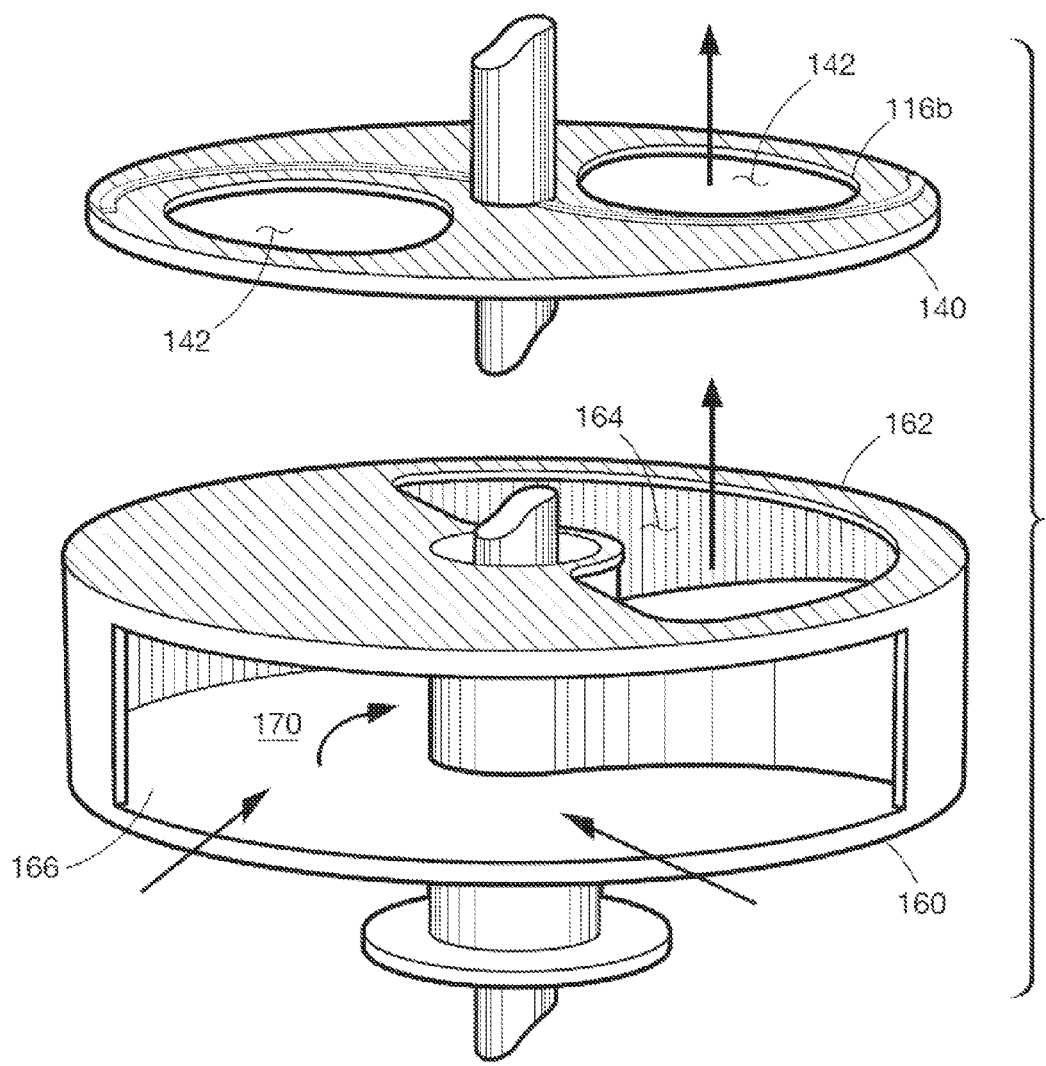
FIG. 6 is an exploded perspective view of an exemplary plenum and the lower portion of a turbine for use with the vertical axis wind turbine system of FIG. 1.
Figure 7:
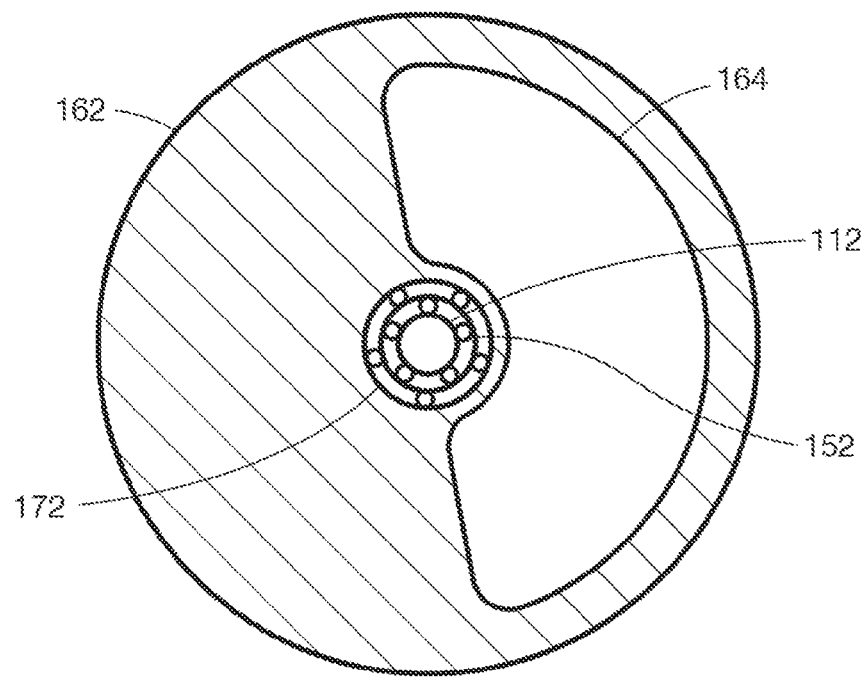
FIG. 7 is a sectional view of the vertical axis wind turbine system of FIG. 1, taken along lines 7-7 of FIG. 1.

Referring to FIGS. 6 and 7 as well as to FIG. 1, plenum 160 includes a top portion 162 that is disposed proximate to lower platen 140 and has an outlet port 164 therein. Outlet port 164 is in fluid communication with at least one of lower platen openings 142. Outlet port 164 is generally semi-annularly shaped is about one half the size of top portion 162.

Plenum 160 also includes a vertical plenum inlet 166 that is located on the windward side of plenum 160 and captures wind blown into plenum 160. Vertical plenum inlet 166 may have an area approximately the same size as the surface area of lower platen 140 and may include a mesh screen 168 to prevent unwanted debris and birds from entering plenum 160. Outlet port 164 is located relative to vertical plenum inlet 166 such that, when vertical plenum inlet 166 is facing the wind, outlet port 164 discharges wind to opening 142 in lower platen 140 when opening 142 is on the leeward side of vane 116.

A plenum passage 170 provides fluid communication between plenum inlet 166 and outlet port 164. Plenum passage 170 is disposed within plenum 160 to direct wind entering plenum 160 in a helical direction in the direction of rotation of turbine 110 as the wind is directed upward toward and out of outlet port 164.

Referring to FIG. 5, plenum 160 includes bearings, such as, for example, ball bearings 172 that rotatably couple plenum 160 to stationary mount 150 for rotation along axis 114 about stationary mount 150. Those skilled in the art will recognize that other types of bearings besides ball bearings may be used.

As shown in the exemplary embodiment of FIG. 5, two sets of bearings 172 may be used, although more or less than two sets of bearings 172 may be used.

Plenum 160 also includes a directional device, such as a tail 174, that orients plenum 160 independently of the rotation of turbine 110 and rotates plenum 160 so that vertical plenum inlet 162 rotates to the windward side of system 100.

A venturi 180 is disposed above vertical axis wind turbine 110 and is rotatably mounted about shaft 112 for rotation about vertical axis 114. In an exemplary embodiment, venturi 180 is closely spaced from upper platen 130, such as, for example, about ¼ inch (about 0.62 cm).

Venturi 180 includes a bottom portion 182 disposed proximate to upper platen 130 and has an inlet port 184 therein. Inlet port 184 is in fluid communication with at least one of upper platen openings 132a, 132b. Venturi 180 may include a lip 185 that extends downward from a bottom portion 182 of venturi 180. Lip 185 shields the gap between venturi 180 and upper platen 130 and reduces foreign matter, including rain, from entering into the gap.

Venturi 180 also includes a venturi outlet 186 that discharges wind from venturi 180 to the atmosphere on the leeward side of venturi 180. Venturi outlet 186 may have an area approximately the same size as the surface area of upper platen 130 and may include a mesh screen 188 to prevent unwanted debris and birds from entering venturi 180. A venturi passage 190 provides fluid communication between inlet port 184 and the venturi outlet 186.

Venturi 180 also includes a directional device, such as a fin 188, that orients venturi 180 independently of the rotation of turbine 110 and rotates venturi 180 so that venturi outlet 186 rotates to the leeward side of system 100. Fin 192 may be disposed on the top of venturi 180 so as not to disrupt the flow of wind exiting venturi outlet 186.

Inlet port 184 is located relative to fin 192 such that, when venturi outlet 186 is facing the leeward direction, inlet port 184 receives wind from opening 132 in upper platen 130 when opening 132 is on the leeward side of vane 116.

Figure 8:
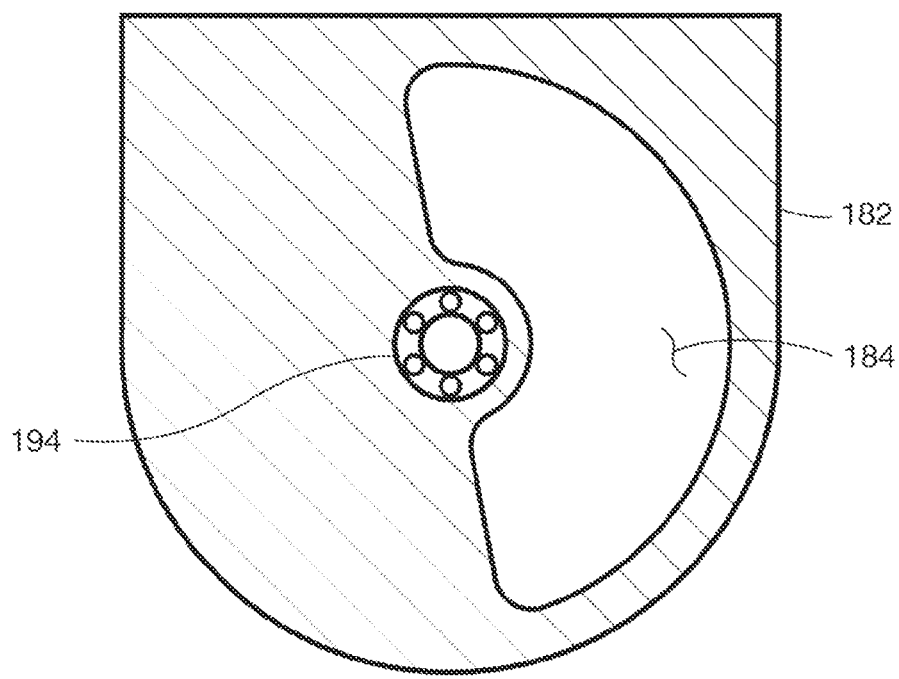
FIG. 8 is a sectional view of the vertical axis wind turbine system of FIG. 1, taken along lines 8-8 of FIG. 1.
Figure 9:
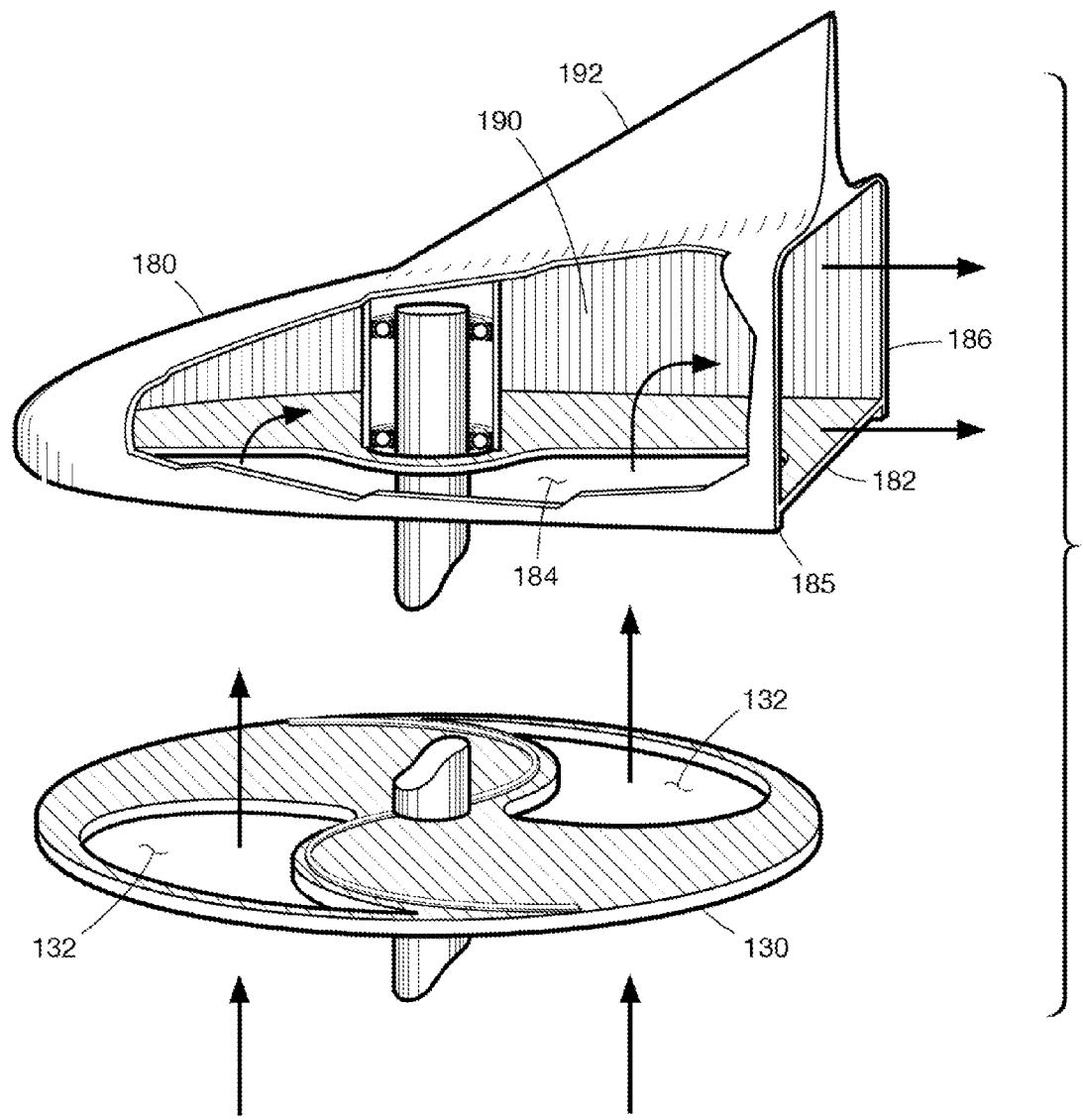
FIG. 9 is an exploded perspective view of an exemplary venturi and the upper portion of the turbine for use with the vertical axis wind turbine system of FIG. 1.

Referring to FIG. 8, venturi 180 includes bearings, such as, for example, ball bearings 194 that rotatably couple venturi 180 to support shaft 112 for rotation along axis 114 about support shaft 112. Those skilled in the art will recognize that other types of bearings besides ball bearings may be used.

While the exemplary embodiment of system 100 described above uses venturi 180, those skilled in the art will recognize that venturi 180 may be omitted. In such an embodiment, wind exiting upper platen openings 132a, 132b is discharged above turbine 110 to atmosphere. Alternatively, upper platen openings 132a, 132b may be omitted as well.

In operation, when a wind begins to blow, the wind impacts plenum tail 174 and venturi fin 192 and rotates plenum 160 and venturi 180 such that plenum inlet 166 faces the windward side of system 100 and venturi outlet 186 faces the leeward side of system 100. The wind impacts on turbine 110 and vanes 116 begin to rotate. The wind impacts the windward side of concave face 118a of vane 116a and the windward side of convex face 120b of vane 116b. The shape of concave face 118a absorbs a larger rotating force of the wind than the shape of convex face 120b, thereby rotating turbine 110 in the direction of arrow "R" as shown in FIG. 1.

The rotation of vanes 116 consequently rotates vertical shaft 112, which, in turn, operates generator 154 to generate electricity. When system 100 is subjected to a wind, turbine 110 begins to rotate irrespective of the direction from which the wind is blowing.

The rotation of turbine 110 rotates upper platen 130 and lower platen 140 such that openings 132 in upper platen 130 are periodically in fluid communication with venturi inlet port 184 and openings 142 in lower platen 140 are periodically in fluid communication with plenum outlet port 164.

As the wind blows, wind impacting plenum 160 enters plenum inlet 166 and follows plenum passage 170 to outlet port 164. Plenum passage 170 redirects the wind through plenum 160 such that, when an opening 142 in lower platen 140 coincides with plenum outlet port 164, the wind flows through opening 142 and to the leeward concave face 118 of vane 116. The increased wind speed generated by the reduction in cross-sectional area as the wind flows through plenum passage 170 raises the air pressure on the leeward concave face 118 of vane 116 and assists in rotating turbine 110.

As turbine 110 rotates, the windward concave face 118 that is being impacted by the wind rotates toward the leeward side of turbine 110. Additionally, the wind impacting on the windward side of venturi 180 flows around venturi 180, generating an area of low pressure on the leeward side of venturi 180 at venturi outlet 186.

The low pressure draws air from the windward side of convex face 120 of vane 116 into venturi 180. Venturi 180 draws the air in a vertical direction through upper platen opening 132 and into venturi passage 190, where the air is deflected to a horizontal direction and drawn from venturi outlet 186 to atmosphere on the leeward side of turbine 110. The drawing of air from the windward side of convex face 120 of vane 116 reduces the force of wind against the windward side of convex face 120 of vane 116, thereby reducing a force that counteracts the rotation of turbine 110.

Turbine 110, plenum 160, and venturi 180 may be constructed from aluminum, composite materials, or other light, high strength materials. In an exemplary embodiment, recycled plastic may be used.

Figure 10:
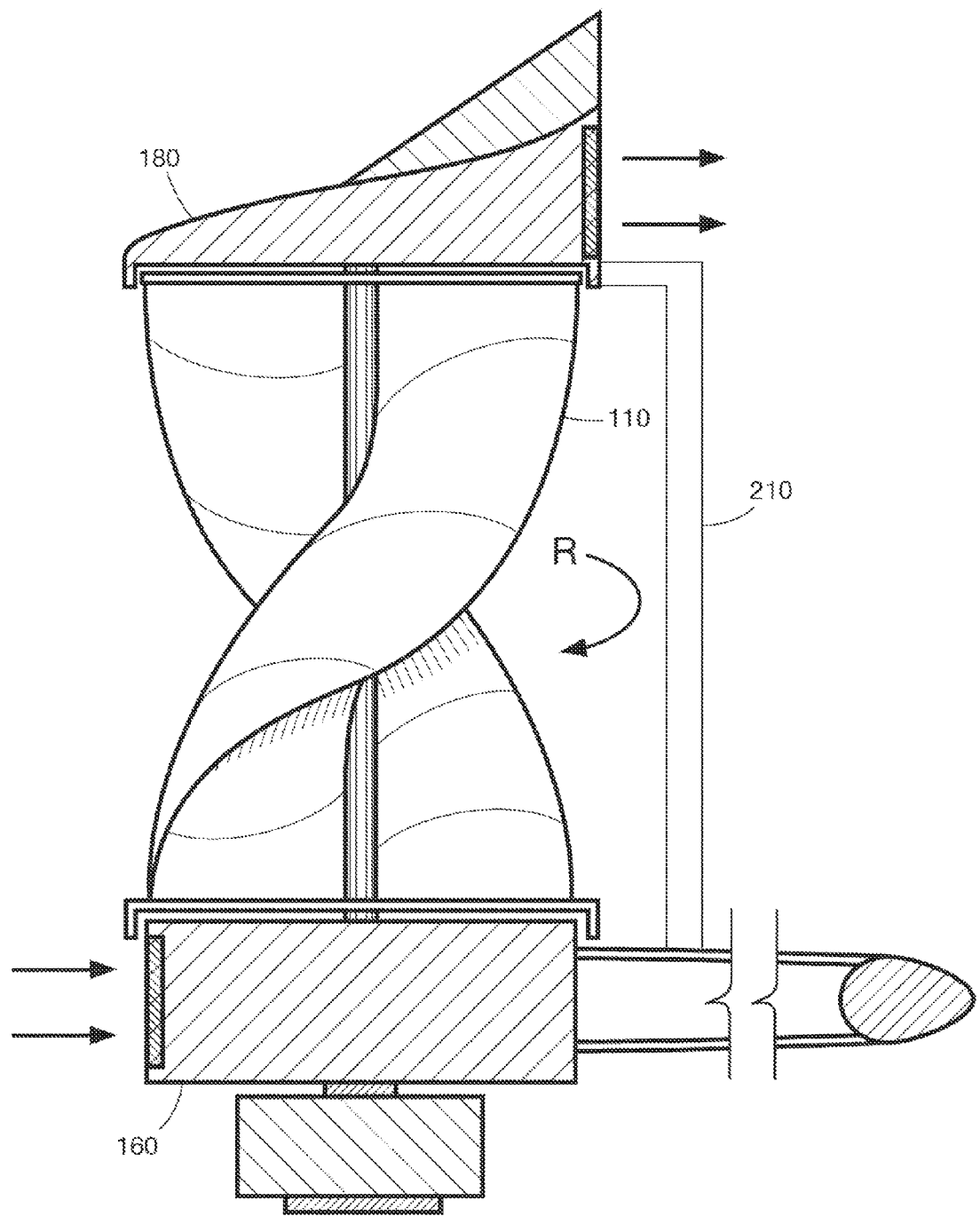
FIG. 10 is a side elevational view of a vertical axis wind turbine system according to another exemplary embodiment of the present invention.

While system 100 discussed above discloses plenum 160 and venturi 180 being independently rotatable about shaft 112, those skilled in the art will recognize that plenum 160 and venturi 180 may be coupled together to rotate as a unit. In the embodiment illustrated in FIG. 10, plenum 160 and venturi 180 are coupled to a common tail 210. While tail 210 is illustrated in FIG. 10 as extending leeward of plenum 160, those skilled in the art will recognize that tail 210 may extend below plenum 160, leeward of turbine 110 or above venturi 180.

While the principles of the invention have been described above in connection with preferred embodiments, it is to be clearly understood that this description is made only by way of example and not as a limitation of the scope of the invention.

What is claimed is:

1. A vertical axis wind turbine system comprising:
    a vertical axis wind turbine having a windward side and a leeward side, the vertical axis wind turbine comprising:
        a vertical shaft rotatably mounted about a vertical axis;
        a plurality of vanes coupled to the vertical shaft, each of the plurality of vanes having a concave face and an opposing convex face;
    a deflector rotatably disposed about the vertical axis independently of the vertical axis wind turbine, the deflector being adapted to deflect wind from the windward side of the vertical axis wind turbine to a concave face on the leeward side of the vertical axis wind turbine; and
    a plenum tail fixedly connected to the deflector to rotate the deflector in response to a direction of wind impacting the deflector.

2. The vertical axis wind turbine according to claim 1, wherein the deflector is configured to deflect the wind from a horizontal direction to a vertical direction.

3. The vertical axis wind turbine according to claim 1, further comprising a venturi rotatably disposed about the vertical axis independently of the vertical axis wind turbine, the venturi being configured to direct wind from the windward side of the vertical axis wind turbine to a leeward side of the venturi.

4. The vertical axis wind turbine according to claim 3, wherein the venturi is configured to deflect the wind from a vertical direction to a horizontal direction.

5. The vertical axis wind turbine according to claim 3, wherein the venturi has an outlet having a first size and an inlet having a second size about one half the first size.

6. The vertical axis wind turbine according to claim 3, wherein the venturi has a venturi inlet and wherein the vertical axis wind turbine further comprises an upper platen having an opening periodically in fluid communication with the venturi inlet.

7. The vertical axis wind turbine according to claim 1, wherein the deflector has an intake having a first size and an outlet having a second size about one half the first size.

8. The vertical axis wind turbine according to claim 1, wherein the deflector has a deflector outlet and wherein the vertical axis wind turbine further comprises a lower platen having an opening periodically in fluid communication with the deflector outlet.

9. A vertical axis wind turbine system comprising:
a vertical axis wind turbine comprising:
a vertical shaft rotatably mounted about a vertical axis;
an upper platen coupled to the vertical shaft;
a plurality of vanes coupled to the vertical shaft and extending downward from the upper platen, each of the plurality of vanes having a concave face and an opposing convex face; and
a lower platen coupled to the vertical shaft and to each of the plurality of vanes, the lower platen having an opening formed therein proximate to the concave face of each of the plurality of vanes; and
a plenum disposed below the vertical axis wind turbine and rotatably mounted about the shaft for rotation about the vertical axis, the plenum comprising:
a top portion disposed proximate to the lower platen and having an outlet port therein, the outlet port being in fluid communication with at least one of the lower platen openings;
a plenum inlet; and
a plenum passage providing fluid communication between the plenum inlet and the outlet port; and
a plenum tail fixedly connected to the plenum to rotate the plenum in response to a direction of wind impacting the plenum.

10. The vertical axis wind turbine system according to claim 9, further comprising a generator coupled to the output shaft.

11. The vertical axis wind turbine system according to claim 10, wherein the generator is directly coupled to the output shaft.

12. The vertical axis wind turbine system according to claim 9, wherein the plenum is mounted to the vertical shaft such that the plenum rotates independently of the wind turbine.

13. The vertical axis wind turbine system according to claim 9, wherein the plenum inlet is disposed on a windward side of the plenum.

14. The vertical axis wind turbine system according to claim 9, wherein the upper platen comprises an opening therein disposed proximate to the convex face of each of the plurality of vanes.

15. The vertical axis wind turbine system according to claim 14, further comprising a venturi disposed above the vertical axis wind turbine and rotatably mounted about the shaft for rotation about the vertical axis, the venturi comprising:
a bottom portion disposed proximate to the upper platen and having an inlet port therein, the inlet port being in fluid communication with at least one of the upper platen openings;
a venturi outlet; and
a venturi passage providing fluid communication between the inlet port and the venturi outlet.

16. The vertical axis wind turbine system according to claim 15, wherein the venturi further comprises a directional device disposed on a leeward side of the venturi.

17. A vertical axis wind turbine system comprising:
a vertical axis wind turbine comprising:
a vertical shaft rotatably mounted about a vertical axis;
a plurality of vanes coupled to the vertical shaft, each of the plurality of vanes having a concave face and an opposing convex face;
an upper platen coupled to the vertical shaft and to each of the plurality of vanes, the upper platen having an opening therein disposed proximate to the convex face of each of the plurality of vanes;
a lower platen coupled to the vertical shaft and to each of the plurality of vanes, the lower platen having an opening formed therein proximate to the concave face of each of the plurality of vanes;
a plenum disposed below the vertical axis wind turbine and rotatably mounted about the shaft for rotation about the vertical axis, the plenum comprising:
a top portion disposed proximate to the lower platen and having an outlet port therein, the outlet port being in fluid communication with at least one of the lower platen openings;
a plenum inlet; and
a plenum passage providing fluid communication between the plenum inlet and the outlet port;
a plenum tail fixedly connected to the plenum to rotate the plenum in response to a direction of wind impacting the plenum; and
a venturi disposed above the vertical axis wind turbine and rotatably mounted about the shaft for rotation about the vertical axis, the venturi comprising:
a bottom portion disposed proximate to the upper platen and having an inlet port therein, the inlet port being in fluid communication with at least one of the upper platen openings;
a venturi outlet; and
a venturi passage providing fluid communication between the inlet port and the venturi outlet.

* * * * *